United States Patent [19]

Vanlandingham et al.

[11] 4,128,932
[45] * Dec. 12, 1978

[54] METHOD FOR TURNING A TRACK BUSHING

[75] Inventors: Harold W. Vanlandingham, Washington; Roger L. Boggs; David A. Bullock, both of East Peoria, all of Ill.; James N. Maytum, Waverly, Iowa

[73] Assignee: Caterpillar Tractor Co., Peoria, Ill.

[*] Notice: The portion of the term of this patent subsequent to Sep. 27, 1994, has been disclaimed.

[21] Appl. No.: 717,717

[22] Filed: Aug. 25, 1976

Related U.S. Application Data

[62] Division of Ser. No. 617,347, Sep. 29, 1975, Pat. No. 4,002,090, which is a division of Ser. No. 348,886, Apr. 9, 1973, Pat. No. 3,915,036.

[51] Int. Cl.² .............................................. B23P 7/00
[52] U.S. Cl. .................................... 29/401 R; 29/427
[58] Field of Search ..................... 81/53, 57.33, 57.32, 81/57.29, 3 R; 29/401 R, 252, 427

[56] References Cited

U.S. PATENT DOCUMENTS

| 683,840 | 1/1901 | Blunk | 81/74 |
|---|---|---|---|
| 1,033,211 | 7/1912 | Sullivan | 81/74 |
| 2,540,553 | 2/1961 | Shobe | 81/57.32 |
| 2,854,216 | 9/1958 | Bjalme | 81/57.33 |

Primary Examiner—James L. Jones, Jr.
Assistant Examiner—Roscoe V. Parker, Jr.
Attorney, Agent, or Firm—Phillips, Moore, Weissenberger, Lempio & Strabala

[57] ABSTRACT

Disclosed herein is a method for rotating the bushings of an assembled and in-place track of a tractor to present new bushing wear areas to the sprockets which engage these bushings.

1 Claim, 6 Drawing Figures

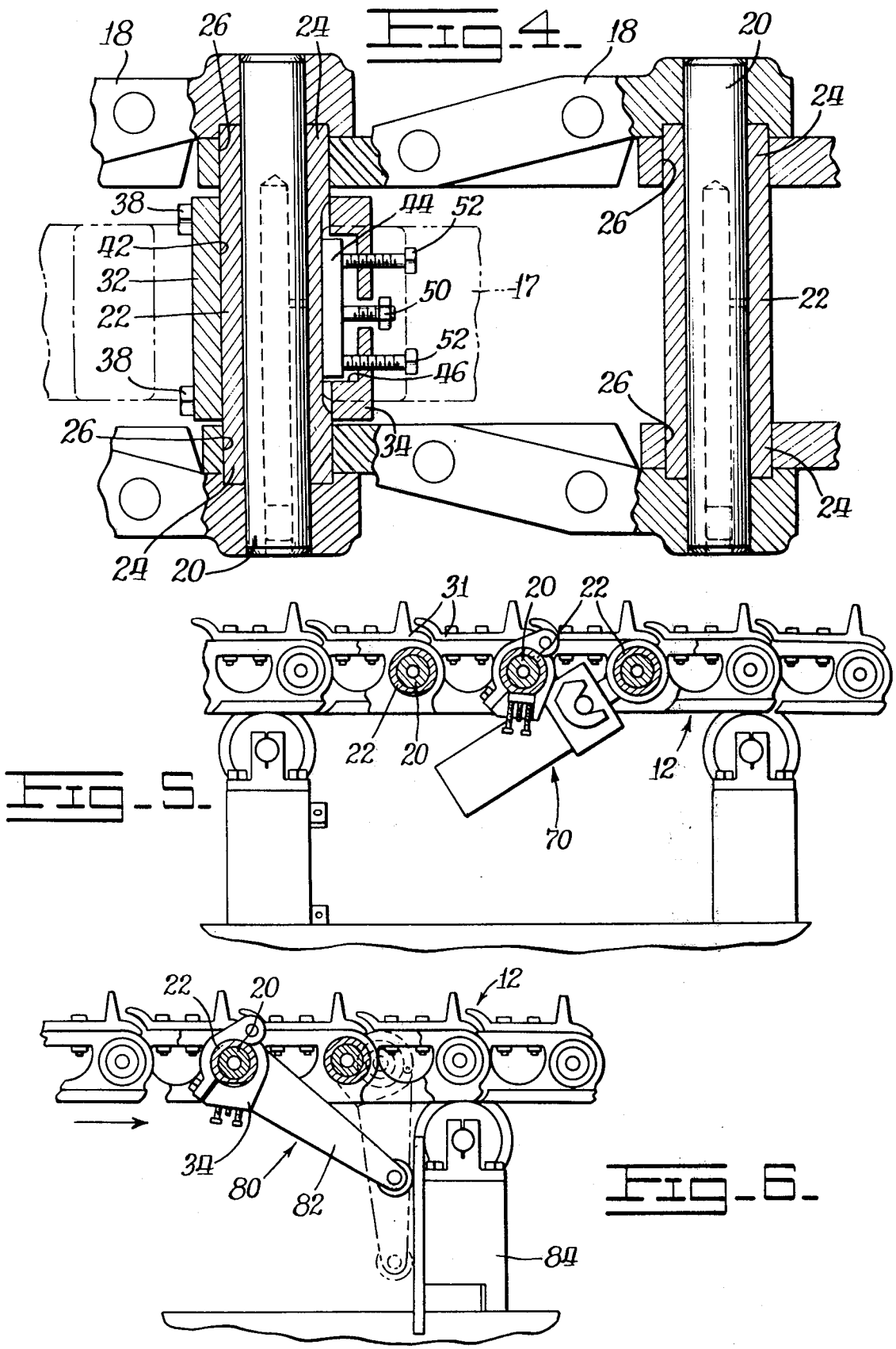

METHOD FOR TURNING A TRACK BUSHING

This is a division of Ser. No. 617,347, filed Sept. 29, 1975, now U.S. Pat. No. 4,002,090, which is a division of Ser. No. 348,886, filed Apr. 9, 1973, now U.S. Pat. No. 3,915,036.

BACKGROUND OF THE INVENTION

Commonly used track chains for earthmoving vehicles comprise a plurality of track links. The track links are connected into two parallel endless chains by means of track link hinge joints having track pins joining the ends of adjacent pairs of links and spanning the space between the parallel chains. Drive sprockets drive the track chains and provide locomotion for the vehicle by acting against bushings upon the track pins.

For efficient and low cost operation, it is, of course, desirable to construct a track chain in a manner to provide for long, trouble-free operating life. All track parts are subject to a high rate of wear because of the service they perform and the environment in which they operate. Recent developments in seals and lubrication methods promise to increase the life of some track parts measurably and it appears that the track pin bushing in its present form may well continue to be the first element of the track to fail.

Force for driving the tracks by sprocket is received upon a given portion of the bushing. Additionally, as each such bushing comes into engagement with or tends to be disengaged from the sprocket, there is relative pivotal motion between the two adjacent links. Since the bushing is conventionally secured to one of these links, it is caused to rotate while in engagement with the sprocket. The rotation of the bushing against the sprocket is commonly referred to as "scrubbing" and causes substantial abrasion of the bushing.

Prior art efforts to provide long life bushings have been directed at compensating for such abrasion of the bushings. For example, it has been recommended practice to reverse each bushing after a measured extent of wear, so that such wear occurs on different portions of the bushing surface.

Heretofore, such reversing of the bushing required disassembly and reassembly of the track chain, which is, of course, undesirable due to the high labor cost thereof. Rather, it would clearly be highly desirable to be able to rotate the bushings to present another wear surface thereof to the sprocket with the track chains in place on the vehicle (i.e., not disassembled).

SUMMARY OF THE INVENTION

It is accordingly an object of this invention to provide a method for conveniently rotating the bushings of a track chain to present new wear surfaces of the bushings to the driving sprocket thereof.

It is a further object of this invention to provide a method which, while fulfilling the above object, allows the bushing to be turned with the tracks in place on the tractor.

It is a still further object of this invention to provide a method which, while fulfilling the above objects, is simple in operation.

Broadly stated, the invention is for a method of rotating a bushing which is one of a plurality thereof associated with a series of track links, with the bushings being arranged for engagement between teeth of a track driving sprocket of a tractor. The method comprises providing arm means attached to the bushing, operating the tractor and track links to bring the arm means into contact with a body affixed and stationary relative to the tractor, and further operating the tractor and track links causing force to be applied between the body and the arm means thus applying rotative force to the bushing.

BRIEF DESCRIPTION OF THE DRAWINGS

These and other objects of the invention will become apparent from a study of the following specification and drawings, in which:

FIG. 4 is a plan sectional view of the apparatus as applied to the bushing of the tractor;

FIG. 5 is a side elevation of a second embodiment of the invention as applied to the track of a tractor; and FIG. 6 is a side elevation of a third embodiment of the invention as applied to the track of a tractor.

DESCRIPTION OF A PREFERRED EMBODIMENT

Figure 1:
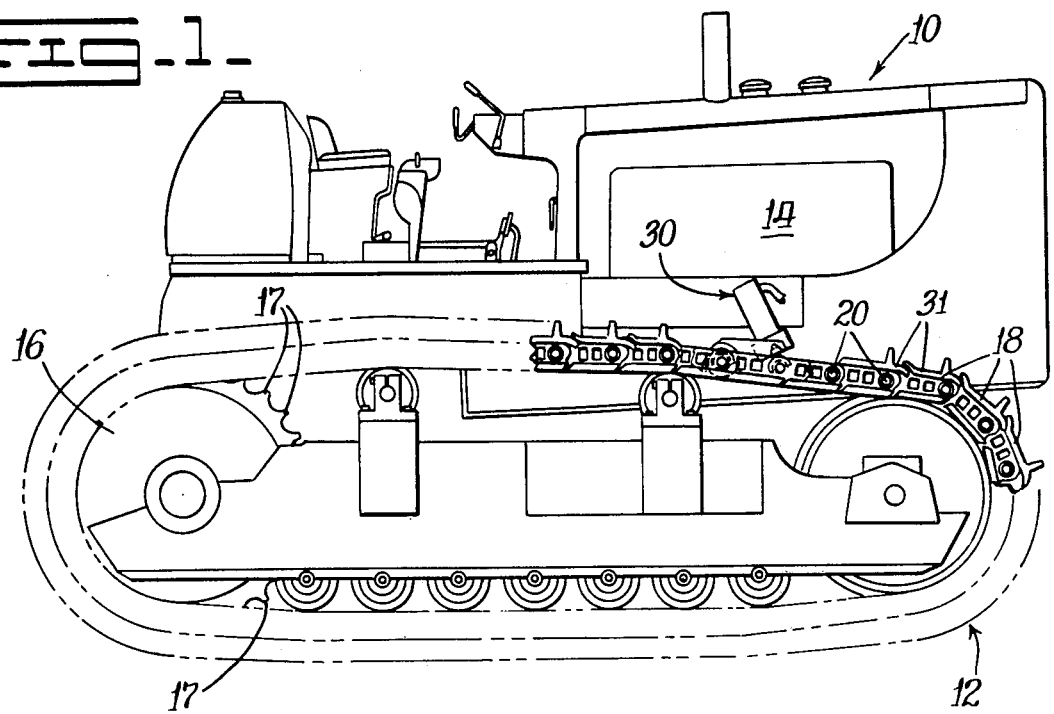
FIG. 1 is a side elevation of a tractor incorporating the invention.

Referring to the drawings, FIG. 1 depicts a typical crawler tractor 10 used in the earthmoving industry to perform such heavy work as bulldozing and ripping, both of which apply and account for high loads and wear of the tracks 12 that are used for driving and steering purposes. In the normal manner, power is provided by an engine 14 through a power train to a pair of sprockets 16 (one on either side of the tractor 10).

Each track 12 includes a series of interconnected track links 18 which are interconnected by pins 20 as shown in FIG. 4 and as well known. Each pin 20 has disposed thereabout a bushing 22, the ends 24 of which are a press fit in apertures 26 in the ends of an associated link 18. These bushings 22 are arranged for engagement between teeth 17 of the sprocket 16, so that power may be conveyed to the track 12. These bushing-and-pin assemblies form hinge joints that articulately couple pairs of links 18 together.

Figure 2:
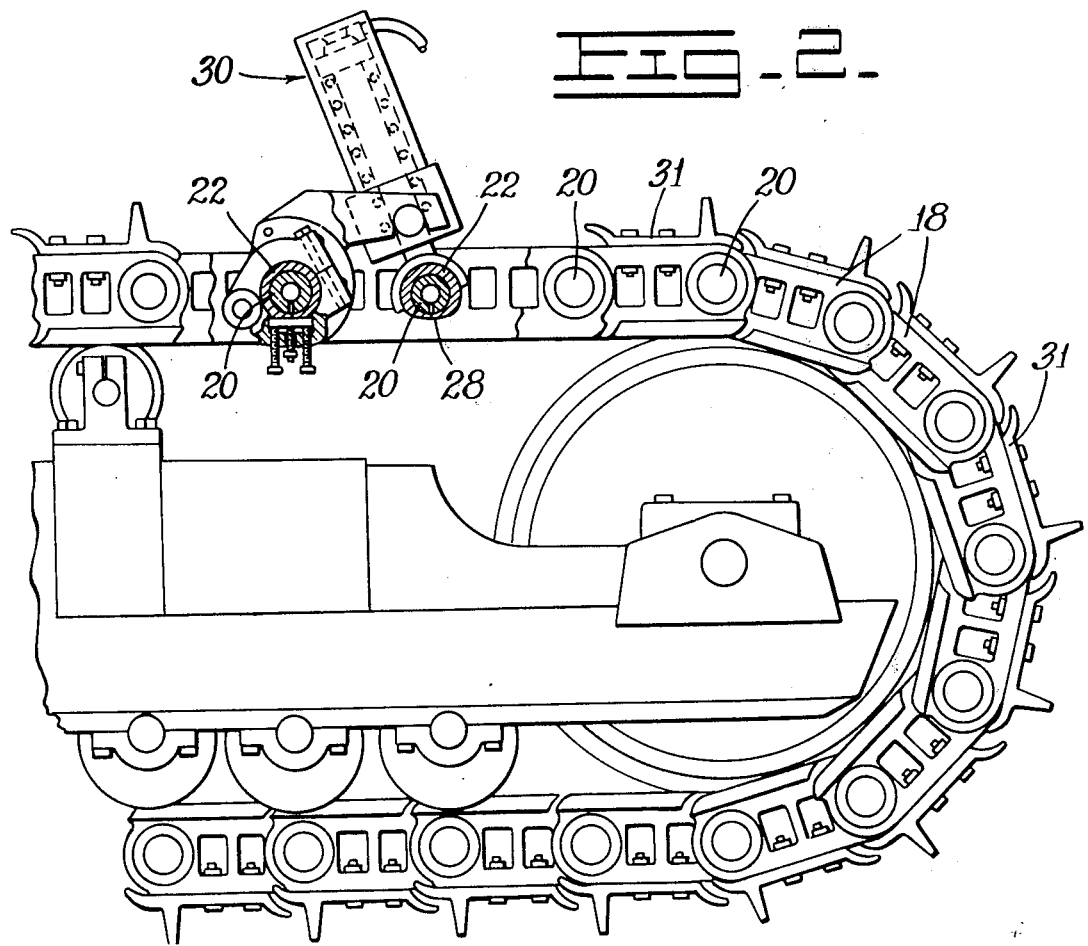
FIG. 2 is a side elevation of the front portion of the tractor of FIG. 1.
Figure 3:
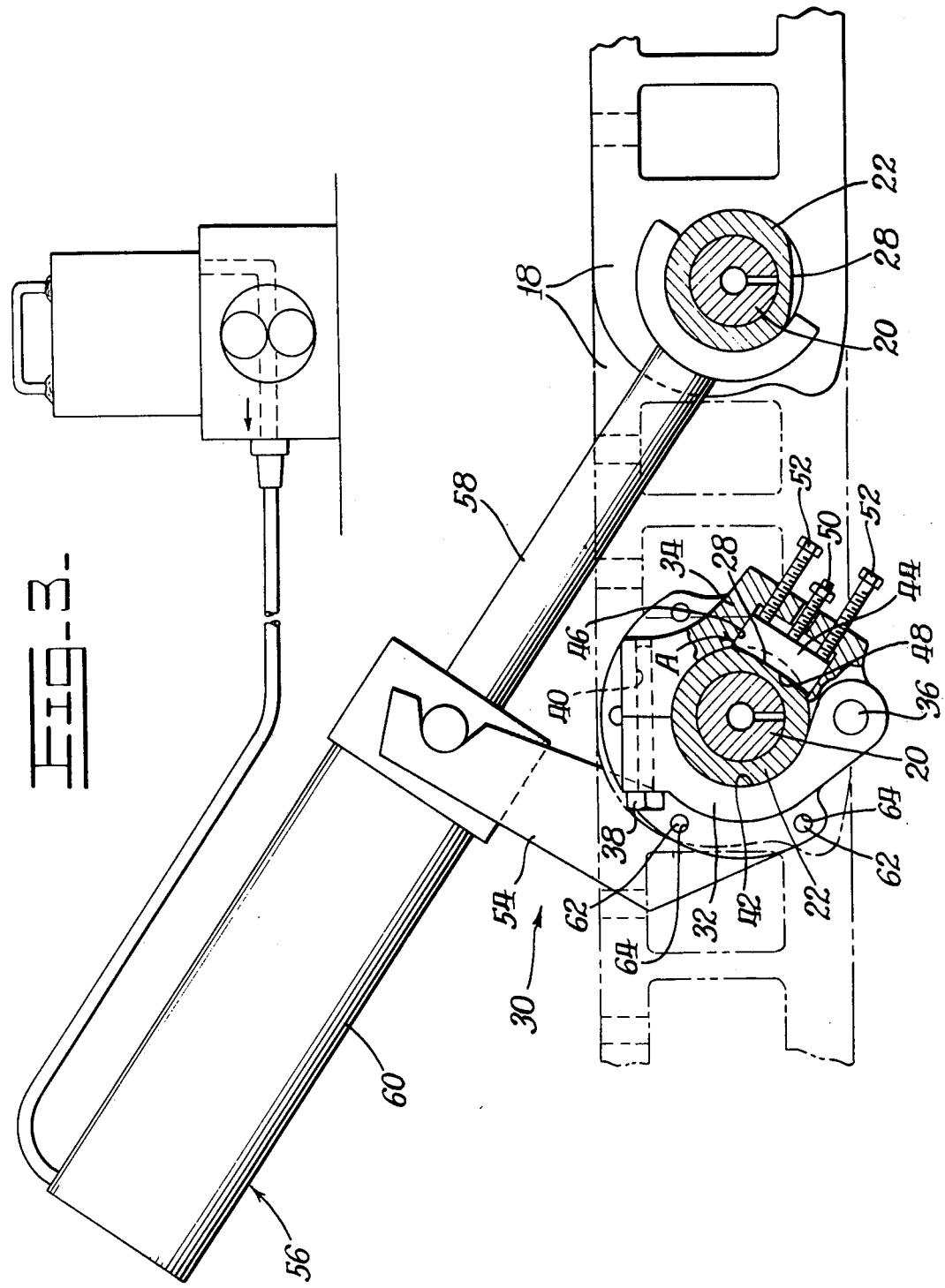
FIG. 3 is a side elevation of the inventive apparatus.

In such a severe environment of moving earth and rock, it can be readily appreciated loads applied by the sprocket teeth 17 upon the engaging surfaces of the track bushings 22 can cause high wear. Such bushing-sprocket engagement area is normally substantially unchanging as the tractor track 12 is operated, so that after a period of time, a wear area as shown at 28 on each bushing 22 will be defined (FIGS. 2 and 3).

As stated above, in the prior art, after a certain degree of such wear, the track 12 must be completely disassembled to allow turning or rotation of the bushings 22 to define new sprocket-bushing engaging areas. The apparatus 30 of FIGS. 1-4 is designed to provide such turning of bushings 22 with the track 12 in the state shown, with only the removal of track shoes 31 being required (i.e., the track 12 still being "substantially assembled").

The apparatus 30 is made up of a pair of pivotally connected members 32,34 which are pivotal about pivot connection 36 inwardly of each other to be positioned about a bushing 22, and outwardly of each other to allow removal thereof from the bushing 22. With the members 32,34 so pivoted inwardly and about bushing 22, they may be fixed together by means of bolts 38, which may be threaded into tapped hole 40, as shown.

A centrally disposed bore 42 formed jointly by members 32,34 is sized to be in close proximity to the bushing 22. An insert 44 is in sliding relation with an aperture 46 defined by member 34, being generally a loose fit therein, and is movable therein inwardly and outwardly of the bushing 22, in fact being movable substantially radially of the bushing 22, with the members 32,34 as shown in position in FIG. 3. The members 32,34 are positioned so that the insert 44 may be moved inwardly into the worn area 28 of the bushing 22 to engage the worn area 28. In fact, the insert 44 defines a surface 48 which is adapted to contact the surface of the bushing 22 in the wear area 28, the contacting surface of the insert 44 being shaped to conform generally to the contacting surface of wear area 28 as shown.

In positioning such insert 44, a pilot screw 50 is provided therein. The assembler of the apparatus 30 merely places his finger on the pilot screw 50 to sense proper positioning of the insert 44 relative to the worn area 28. Upon such positioning, the insert 44 may be fixed in such inward position by means of bolts 52.

A pair of arms 54 are connected to the member 32, and extend outwardly of the bushing 22. It will be seen that, upon application of force to the arms 54 about the bushing 22, rotative force is applied to the bushing 22, by means of the insert 44, which will apply a rotative force tangentially at point A.

In FIG. 3 is shown a first system for applying such force. In such FIG. 3, a removable, extensible and retractable jack 56 has its rod end 58 engaged with the bushing 22 which is immediately adjacent the bushing 22 being rotated, and its body 60 engaging the arms 50, so that extension of the jack 56 pivots arms 54 (and bushing 22) counterclockwise as shown in that figure. In such case, since bushings 22 are press-fitted in their respective link ends (FIG. 4), reaction force applied by the rod end 58 is applied within the same link to which the bushing turning force is being applied.

It will be understood that the arms 54 may be attached to the member 32 in a variety of ways as needed. For example, pins as shown at 62 may be utilized in cooperation with holes 64 to allow change of relative position thereof after a full stroke of the jack 56. Thus, the bushing 22 may be rotated a set amount of degrees per full stroke of the jack 56, the apparatus 30 may then be readjusted, and the bushing 22 may be rotated further upon another full stroke of the jack 56.

Alternatively, a ratcheting device associating the arms 54 and member 32 may be provided.

In the use of the apparatus 30, after a bushing 22 is turned as described, the apparatus 30 is then applied to turn the next-rearward bushing 22, etc., the track 12 being moved as necessary to present the bushings 22 in proper position to be so rotated.

In FIG. 5 is shown a variety of apparatus 70 which is disposed inwardly of the track 12. The apparatus is quite compact as shown, and in such an embodiment, it is not necessary to remove the track shoes 31, as shown, to enable the bushings 22 to be turned.

In FIG. 6 is shown other means 80 for applying such necessary force to turn the bushings 22. In such embodiment, elongated arm 82 extends from member 34 downwardly and forwardly thereof. The extended end of the arm 82 is positioned to be contacted by a body 84 fixed relative to the tractor 10, upon forward motion of the tractor 10. Thus, the forward driving force of the tractor 10 is utilized to turn the bushings 22 in this embodiment.

What is claimed is:

1. A method of rotating a bushing which is one of a plurality thereof associated with a series of track links, with the bushings being arranged for engagement between teeth of a track driving sprocket of a tractor, comprising providing arm means attached to the bushing, operating the tractor and track links to bring the arm means into contact with a body affixed and stationary relative to the tractor, and further operating the tractor and track links causing force to be applied between the body and the arm means thus applying rotative force to the bushing.

* * * * *